3,533,013

OPTICAL MASER HAVING MEANS FOR CONCENTRATING THE PUMPING LIGHT ENERGY IN THE CENTRAL PORTION THEREOF
Filed March 23, 1967

INVENTOR
RUSSELL SEITZ
BY
Nolte & Nolte
ATTORNEYS

United States Patent Office 3,533,013
Patented Oct. 6, 1970

3,533,013
OPTICAL MASER HAVING MEANS FOR CONCENTRATING THE PUMPING LIGHT ENERGY IN THE CENTRAL PORTION THEREOF
Russell Seitz, Elberon, N.J., assignor, by mesne assignments, to Elton Industries, Inc., Oyster Bay Cove, N.Y., a corporation of New York
Continuation-in-part of application Ser. No. 290,070, June 24, 1963. This application Mar. 23, 1967, Ser. No. 625,469
Int. Cl. H01s 3/02
U.S. Cl. 331—94.5    5 Claims

ABSTRACT OF THE DISCLOSURE

An optical maser or laser is described in which the laser material is enclosed within an exteriorally silvered generator. The sides of the generator are in the form of confocal parabolic surfaces and a plurality of flash tubes are symmetrically arranged about the laser medium within the generator. The reflecting parabolic surfaces focus the pumping light energy emitted from the flash tubes, along the central axis of the laser material. The concentration of the doping varies decreasingly in the direction away from the central axis of the laser material. As a result, improved efficiency of utilization of the pumping energy is achieved.

This application is a continuation-in-part of my application, Ser. No. 290,070 filed on June 24, 1963, now abandoned.

BACKGROUND OF THE INVENTION

Field of the invention

The present invention relates generally to optical masers or lasers, and in particular to a laser wherein more efficient utilization of pumping energy is provided.

Description of the prior art

In the known lasers, a pumping means is employed to alter the population distribution of energy levels in a suitable medium to thereby achieve a nonequilibrium distribution in the energy levels. A medium in this condition is characteristically described as exhibiting a negative temperature. The application of a signal having a frequency which corresponds to the difference between the energy levels will stimulate the emission of coherent radiation at the frequency of the applied signal. Lasers are now available which can produce coherent radiation in the spectrum from ultra violet to infrared. The operation and theory of such laser devices is well known in the art and will not be considered in great detail in the present application.

It is greatly advantageous to utilize the energy generated by the pumping means at an optimum rate of efficiency. In this manner relatively low energy pumping means may be utilized to produce the desired inverted population within the lasing material, to produce a relatively high output of coherent light energy.

SUMMARY OF THE INVENTION

It is, therefore, a general object of the present invention to provide an improved optical maser.

It is another object of this invention to provide a means for *reducing* the required pumping power for use in an optical maser.

It is still another object of the present invention to provide an improved arrangement for altering the population distribution of energy levels in a laser medium.

It is yet a further object of this invention to provide a laser wherein more efficient use is made of the pumping energy, by means of an increased amount of the optical pumping energy directed towards the center of the laser medium. It is a further object of this invention to provide a laster construction which is significantly sturdier than that of known lasers.

The invention herein disclosed includes an exteriorly silvered generator having disposed therein a plurality of flash tubes arranged within the outer layer of a host material, such as a ruby ($Al_2O_3$) crystal. The crystal includes doping medium such as $Cr^{+++}$ ions which is arranged in various percentage of concentration. The doping concentration increases progressively in a direction from an outer portion of the crystal to the longitudinal axis of said crystal. The flash tubes serve to supply the energy required to pump the doping medium and achieve the desired population inversion and negative temperature state. The silvered reflecting walls of the generator are in the form of confocal parabolic surfaces, having a common focal point at the central axis of the laser crystal. The outer silvered surface serves to focus an increased amount of the light emitted by the flash tubes 20, which are arranged to fire in a predetermined sequence of operation, towards the center of the laser crystal.

The particular arrangement and percentage distribution of the doping medium within the crystal serves to concentrate the reflected light and the light directly emitted from the flash tubes into a beam which is directed towards the center of the crystal. Such an arrangement provides an improved pumping of the doping medium thereby further increasing the efficiency of the laser.

Other and further objects of this invention will be apparent from the following description and claims and may be understood by reference to the accompanying drawings:

Referring now more in detail to the drawings, wherein similar reference numerals identify corresponding parts throughout the several views, 10 represents an optical maser or laser, substantially as shown.

Figure 1:
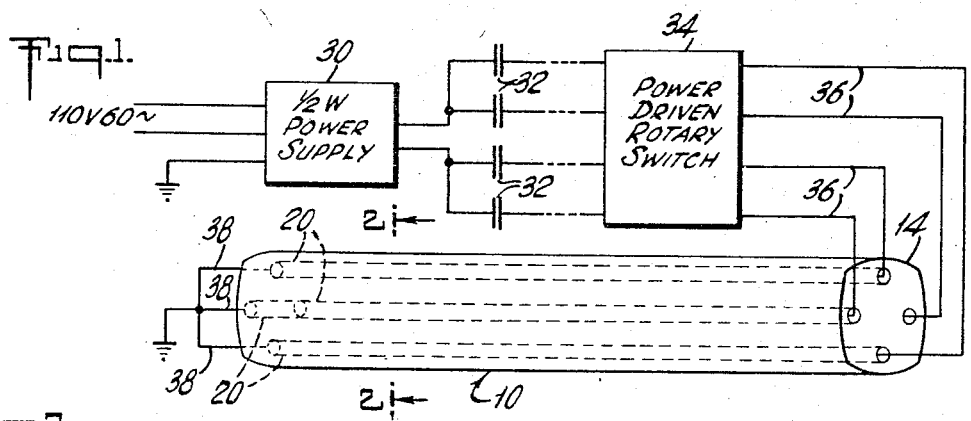
FIG. 1 is a pictorial representation of the generator of this invention, and the electrical circuit therefor.
Figure 2:
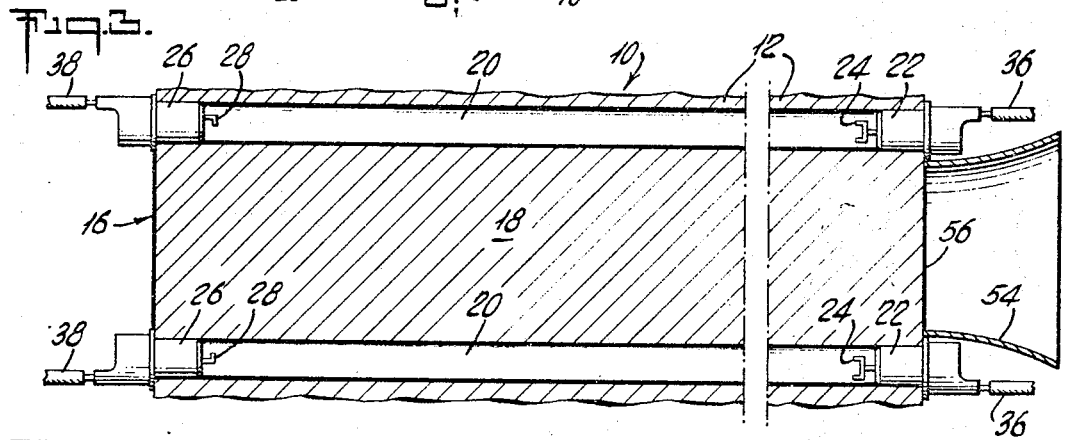
FIG. 2 is a cross-sectional view taken along line 2—2 of FIG. 1.
Figure 3:
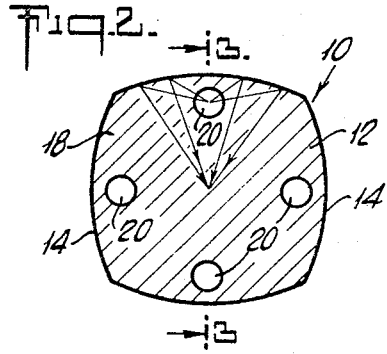
FIG. 3 is a cross-sectional view taken along line 3—3 of FIG. 2.

FIGS. 1 and 2 and 3 illustrate one configuration of a laser which embodies the features of this invention. The laser material 12 includes four outer confocal parabolic surfaces 14, which are completely silvered, in a manner to render surfaces 14 reflective to light energy incident thereon. The geometric equation of the parabolic curve of surfaces 14 is chosen, so that the focal points of surfaces 14 each falls along the longitudinal central axis of the laser material 12. One end of laser material 12 is enclosed by a completely silvered surface 16.

In the laser material 12, the active medium is the ruby crystal 18, in which the chromium $Cr^{+++}$ atoms are raised to excited states in a well known manner by means of optical pumping energy supplied by flash tubes 20, which are preferably of the double walled xenon type. The raising of the energy levels of the chromium atoms to the negative temperature state produces the coherent light beam which is characteristic of laser operation. It is to be understood that other types of laser material may be utilized in place of ruby, such as europium chelate suspended in a suitable host material.

The plurality of double walled xenon flash tubes 20 are arranged within and are surrounded by the ruby crystal 18. In order for the parabolic reflecting surfaces to focus the radiant energy from flash tubes 20 at the central axis of the laser, the flash tubes are positioned near the vertex of parabolic surfaces 14. The flash tubes 20 are cylindrical in shape and extend the length of the crystal 18 and are arranged symmetrically around the ruby crystal. Plugs 22 are inserted into one end of each flash tube 20, and the other ends of the flash tubes 20 have plugs 26 inserted therein. Cathodes 24 and anodes 28 are secured to the terminations of plugs 22 and 26, respectively. As clearly shown in FIG. 3 the anode and cathode of each flash tube are positioned at the same distance from the axis of the cylinder, but apart from each other the distance of the ruby crystal, less the length of the plug insertions. Plugs 22 and 26 include a passage for the insertion therethrough of leads 36 and 38, respectively, to provide an electrical connection with the cathodes and anodes. As shown, the plugs are of one piece, however, any suitable arrangement may be employed to accomplish the same effect, as described herein.

Turning now to FIG. 1, there is shown a schematic representation of the electrical circuit associated with the operation of the flash tubes 20. A one-half wave power supply 30 receives its energy from a 110-volt 60-cycle source (not shown). The output of the one-half wave power supply is fed to a plurality of capacitors 32 which are in turn connected through a power driven rotary switch 34 to their corresponding flash tubes. Leads 36 from the power driven rotary switch are connected through plugs 22 to cathodes 24. Leads 38 which connect through plugs 26 to anodes 28 are connected directly to ground. Flash tubes 20, therefore, are arranged to be fired by the operation of the power driven rotary switch 34 in semicontinuous operation. Thus, the tubes will fire one after the other in clockwise rotation as indicated by arrows 40, when the apparatus is operating.

The firing circuit for the flash tubes 20 may also be readily varied to fire the flash tubes 20 simultaneously on and off. In this embodiment the rotary switch 34 would be removed from the firing circuit.

In another aspect of this invention, the concentration of the chromium ion doping material is varied within the laser material 12. The distribution of the chromium atoms with the laser material is varied in concentration from a maximum of approximately 0.8% at the center of the laser, to a value of approximately .05% at the outer periphery of the laser.

Thus, the doping concentration is arranged to be at the greatest at the center of the laser material. The variation of doping concentration produces a variable index of refraction of the laser crystal 18 toward the central axis thereof. The progressive graduated increase in the $Cr^{+++}$ doping concentration, thus enables light rays to be directed inwardly towards the central longitudinal axis of the crystal. Illustrative rays 45 are shown refracted inwardly by a predetermined amount as they pass through the variably doped region, to finally reach the longitudinal axis of the crystal. It can be understood from the foregoing, therefore, that the light emitted directly from each flash tube 20 will in effect be concentrated into a beam directed towards the central axis of the crystal.

By reference to FIG. 2, it can be seen that the portion of the light that is not directed immediately towards the longitudinal axis of the ruby crystal 18 is reflected from parabolic surfaces 14 to be directed toward the central axis as shown by the arrows 44, which represent light rays emitted from the flash tube 20. It should be understood that rays 44 continue on to the central axis of the crystal in a manner similar to rays 45, as described above. Thus, the particular variation in the doping concentration, as described hereinabove, tends to focus both direct and reflect light from flash tubes 20, such as rays 44 and 45, toward the longitudinal axis of the crystal.

It should be noted that the rays and the angles thereof are exaggerated for purposes of illustration to indicate reflection and refraction of the rays, and in particular the change in the direction of the rays as they pass from regions of differing doping concentration.

A tubular hood 54 is arranged, at the firing end of the generator, to encompass the end 56 of the ruby crystal 18. The end 56, it should be noted, is covered with a 95% silvered coating providing for the passage therethrough of the emitted energy. The tubular hood 54 serves to prevent wire 26 from interfering with the output.

By means of the arrangement of the flash tubes 20, lying within and surrounded by the crystal 18 and disposed with respect to the parabolic reflecting surfaces 14, as shown in FIG. 2, an increase in the proportion of light energy from flash tubes 20 reaching the central axis of the laser crystal 18 is achieved. This results in a marked improvement of laser efficiency.

Accordingly, a lower energy source is required to produce coherent radiation output from the laser device. The resulting structure is also significantly sturdier than previously known structures wherein the flash tubes are disposed external to the laser crystal.

Figure 4:
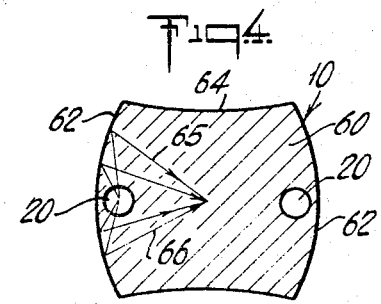
FIG. 4 is a view similar to that of FIG. 2, illustrating an alternate embodiment of the invention.
Figure 5:
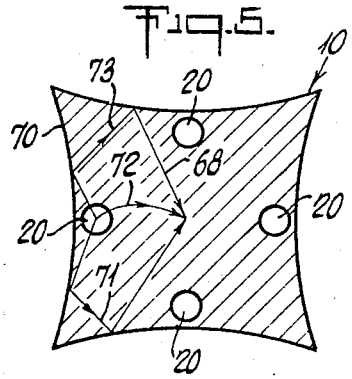
FIG. 5 is a view similar to that of FIGS. 2 and 4, illustrating yet another possible embodiment of this invention.
Figure 6:
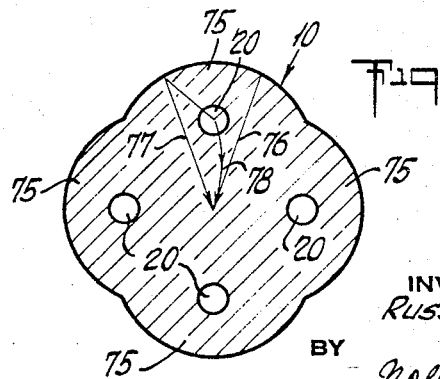
FIG. 6 is a view similar to that of FIGS. 2, 4 and 5, illustrating another possible embodiment of this invention.

Referring now to FIGS. 4, 5 and 6, there are shown alternate cross sections of the laser crystal 18 embodying features of this invention. In each of these embodiments, the doping variations is similar to that described with reference to the first described embodiment.

In FIG. 4, the laser crystal 60 is in the form of two opposed confocal parabolic reflecting surfaces 62. The focal points of both surfaces 62 are along the central longitudinal axis of crystal 60. The other opposed parabolic reflecting surfaces 64 have common latus recti which pass through the confocal point of parabolic surfaces 62. A pair of opposed doubled walled xenon flash tubes 20, is disposed within crystal 62 and arranged near the vertices of parabolic surfaces 62. Illustrative rays 65 and 66 leaving flash tube 20 are shown being reflected and refracted by means of the parabolic reflecting surface 62 and the varying doping concentration towards the central longitudinal axis of crystal 60.

In the embodiment of FIG. 5, the reflecting surfaces of the laser crystal 68 are formed in to opposed parabolic reflecting surfaces 70 having their respective latus recti intersecting at the central longitudinal axis of the crystal 68. Once again the light emitted from flash tubes 20 is reflected by means of the parabolic reflecting surfaces 70 to focus along the crystal's central axis, as shown by typical rays 71 and 72. Ray 73 is not reflected by surface 70, but rather is refracted towards the crystal's central axis due to the variable doping of the laser crystal.

In the embodiment shown in FIG. 6 the laser crystal 74 has a cross section in the form of two transversely intersecting ellipses. The outer surfaces 75 of each quadrant of the crystal are coated with a reflecting material such as silver, which reflects the light incident from flash tubes 20 into a beam converging at the central axis of the laser device as shown by typical reflected rays 76 and 77. Typical ray 78 is directed towards the central axis of the laser by means of the variably concentrated doping material in the crystal 74 in the manner described above.

The arrangement and components of the apparatus, as described, serve to provide, in a more efficient manner, an electomagnetic radiation output at the firing end of the laser.

While various embodiments of the invention has been shown and described in detail to illustrated the application of the inventive principles, it should be understood that the invention may be embodied otherwise without departing from such principles.

I have described what I beieve to be the best embodiments of my invention. I do not wish, however to be confined to the embodiments shown, but what I desire to cover by Letters Patent is set forth in the following claims.

What is claimed is:

1. An optical maser, comprising a material capable of being optically excited to produce maser action, and at least two oppositely disposed flash tubes located within said material, said material having distributed therein, in varying concentrations, a doping ingredient, the concentration being greatest at the central portion of said material, the outer surfaces of said material being coated with reflecting means for directing optical energy from said flash tubes towards said central portion.

2. An optical maser as defined in claim 1, wherein said directing means are in the form of at least two opposed parabolic surfaces having their common focal point lo- 3. An optical maser as defined in claim 1, wherein said directing means comprises two pairs of opposed parabolic eflecting surfaces having their respective latus recti cated at said central portion.
bolic reflecting surfaces each having a common focal point located at said central portion.

4. An optical maser as defined in claim 1, wherein said directing means comprises at least 2 opposed parabolic surfaces having their respective latus recti intersecting at said central portion.

5. An optical maser as defined in claim 1 wherein said directing means comprises two pairs of opposed parabolic reflecting surfaces having their respective latus recti intersecting at said central portion.

References Cited

UNITED STATES PATENTS

| | | |
|---|---|---|
| 3,102,920 | 9/1963 | Sirons. |
| 3,212,401 | 10/1965 | Navias. |
| 3,222,615 | 12/1965 | Holly. |
| 3,383,621 | 5/968 | Luck et al. |

FOREIGN PATENTS 1,014,986 12/1965 Great Britain.

WILLIAM L. SIKES, Primary Examiner

U.S. Cl. X.R.

350—175

UNITED STATES PATENT OFFICE
CERTIFICATE OF CORRECTION

Patent No. 3,533,013                          October 6, 1970

Russell Seitz

It is certified that error appears in the above identified patent and that said Letters Patent are hereby corrected as shown below:

In the heading to the printed specification, lines 5 and 6, after "assignments," insert -- one-third --. Column 2, line 4, "laster" should read -- laser --. Column 4, line 74, "beive" should read -- believe --. Column 5, following line 15 the following line should be inserted -- cated at said central portion. --; cancel lines 18 and 19.

Signed and sealed this 26th day of January 1971.

(SEAL)
Attest:

Edward M. Fletcher, Jr.                      WILLIAM E. SCHUYLER, JR.
Attesting Officer                                Commissioner of Patents